Sept. 3, 1935.  K. B. DOUVILLE  2,013,268
PULLEY
Filed April 2, 1934
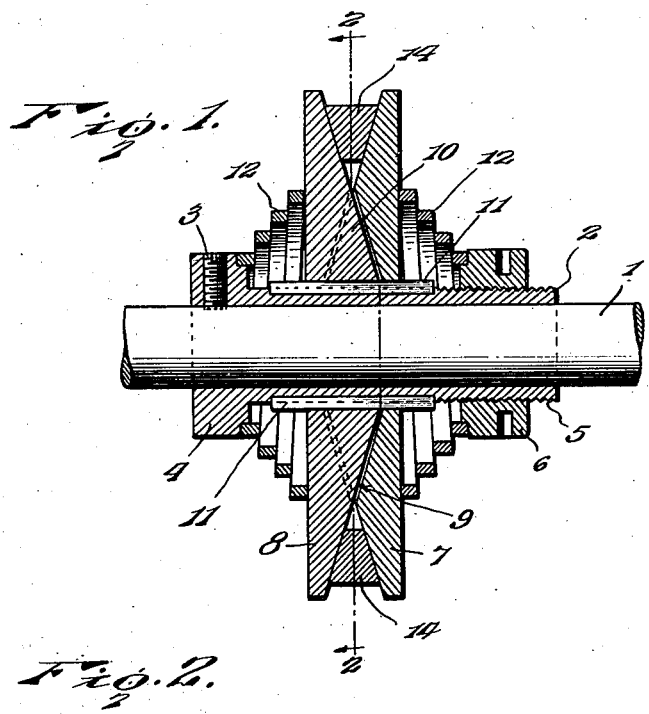
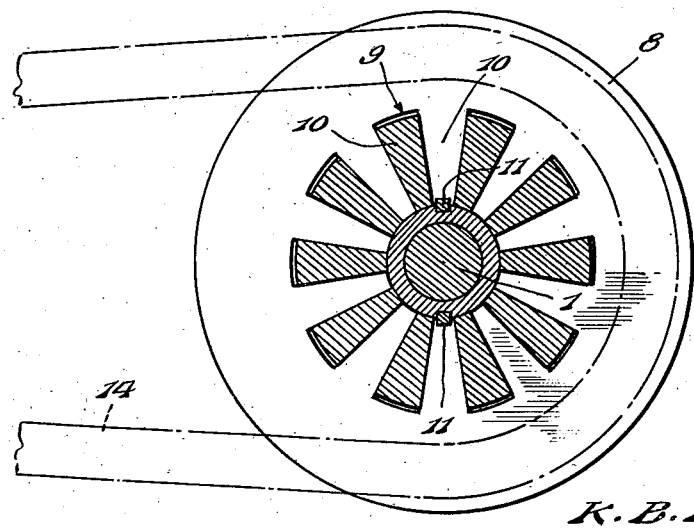
Inventor
K. B. Douville.
By Lacey & Lacey, Attorneys Patented Sept. 3, 1935

2,013,268

UNITED STATES PATENT OFFICE 2,013,268

PULLEY

Kenneth B. Douville, Chicago, Ill.

Application April 2, 1934, Serial No. 718,736

2 Claims. (Cl. 74—242.17)

This invention relates to pulleys and has for its object the provision of a pulley, the effective diameter of which may be adjusted to the demands of the transmitting belt as the tension of the belt may vary. The invention is illustrated in the accompanying drawing and will be hereinafter fully described and particularly defined.

In the drawing,

Figure 1 is an axial section through a pulley and the cooperating parts embodying the invention.

Figure 2 is a transverse section on the line 2—2 of Figure 1.

In the drawing, the numeral 1 designates a portion of a shaft and 2 designates a sleeve or hub which is fitted upon the shaft and may be secured thereto by any approved means, a set screw 3 being shown in Figure 1. The sleeve or hub 2 is provided with an annular flange 4 at one end through which the set screw 3 is mounted and the opposite end of the sleeve is externally threaded, as indicated at 5, to receive a nut 6. The pulley comprises two opposed mating members 7 and 8 which are of counterpart construction and each of which is a disk having one plane face and having its opposite face of a substantially conical formation, the maximum height or thickness of the disk being at its center or hub portion and the minimum height or thickness thereof being at its periphery, as will be understood upon reference to Figure 1. At the apex of the conical structure, each disk is constructed with recesses 9 adapted to receive projecting portions 10 of the opposed disk so that an interlocking engagement between the two disks is effected and the space between the peripheries thereof and their centers will have inwardly converging walls, also as clearly shown in Figure 1. The disks are fitted upon the sleeve or hub 2 and are held thereto by keys 11 which will permit the disks to slide lengthwise of the hub toward or from each other but will prevent rotation of the disks about the hub so that any rotation of the disks will be imparted to or received from the shaft upon which they are mounted. Disposed at the opposite sides of the pulley are helical springs 12 which bear against the outer plane face of the respective pulley members, one of said springs having its outer end seated in an annular recess in the flange 4 while the other spring has its outer end seated in an annular recess in the inner side of the collar or nut 6. It will now be obvious that by adjusting the nut lengthwise of the hub or sleeve 2, the tension of the spring will be easily regulated, and the concentric relation of the springs to the hubs and disks will be maintained at all times. At 14 is indicated a belt trained about the pulley and engaging the opposed faces of the pulley sections. This belt may be the triangular belt illustrated or may have a round or circular cross section.

Assuming that the shaft 1 is a driving shaft and the belt 14 is trained about a fixed pulley upon a driven shaft and that the driven shaft may be adjusted toward or from the driving shaft, it will be readily understood that the springs 12 act constantly to maintain the proper engagement between the belt and the pulley sections 7 and 8. If the driven shaft be set at a farther distance from the driving shaft, the tension upon the belt will be increased and it will ride down between the pulley sections 7 and 8 so that the sections will be forced somewhat apart and the strain upon the belt will be somewhat relieved without destroying the operativeness of the mechanism. Should the belt stretch, for any reason, the motion imparted thereto will tend to cause it to ride toward the periphery of the pulley and the springs acting upon the sides of the pulley will then move the pulley sections toward each other so as to take up the slack of the belt and maintain the desired taut condition thereof. It will thus be seen that I have provided a pulley which may be used with either a V-shaped or round belt or with a standard V-shaped disk in a friction drive and which will automatically adjust itself to the speed of the belt or other elements without requiring any removal or shifting of the belt and without reducing the speed of any of the working parts. It will be noted that the arrangement is such that one nut will adjust the tension of both springs. By providing diametrically opposite keys, balance in the pulley is maintained and the sleeve avoids cutting and wear upon the shaft. By the use of conical springs a wide bearing of the springs against the sides of the pulley is obtained and the unit is kept compact while permitting a wide range of adjustment.

Having thus described the invention, I claim:

1. The combination with a shaft, of a hub secured to the shaft and having one end thereof provided with a laterally extended flange and its other end exteriorly threaded, a pulley consisting of mating counterpart members slidably mounted on the hub and constrained to rotate therewith having conical confronting inner side faces provided with interengaging radially extending projections and recesses, a nut engaging the threaded end of the hub, and helical springs bearing against the outer side faces of said members and against the flange and nut respectively.

2. The combination with a shaft, of a hub fitted upon the shaft and having one end thereof provided with a laterally extended flange formed with a threaded opening, the other end portion of said hub being exteriorly threaded, a set screw engaged in the threaded opening with its inner end bearing against the shaft to cause the hub to rotate with the shaft, a pulley consisting of mating counterpart members keyed upon the hub at diametrically opposite points and having their confronting inner side faces grooved to form radially extending interengaging notches and projections and their outer side faces flat and disposed in a vertical plane, the peripheral edges of the members being spaced apart to form a substantially V-shaped belt-receiving recess between the members, a nut engaging the threaded end of the hub, and helical conical springs bearing at their bases against the flat outer faces of said members and having their apexes seated in recesses in the flange and nut respectively.

KENNETH B. DOUVILLE. [L. S.]